United States Patent
Guo et al.

(10) Patent No.: US 8,090,019 B2
(45) Date of Patent: Jan. 3, 2012

(54) INTRA PREDICTION CIRCUIT DEVICE APPLIED TO THE H.264 VIDEO CODING STANDARD

(75) Inventors: Jiun-In Guo, Chia-Yi (TW); Jinn-Shyan Wang, Chia-Yi (TW); Jia-Wei Chen, Chia-Yi (TW)

(73) Assignee: Jiun-In Guo, Chia-Yi (TW)

( * ) Notice: Subject to any disclaimer, the term of this patent is extended or adjusted under 35 U.S.C. 154(b) by 1517 days.

(21) Appl. No.: 11/517,348

(22) Filed: Sep. 8, 2006

(65) Prior Publication Data

US 2008/0063047 A1    Mar. 13, 2008

(51) Int. Cl.
  *H04N 7/12* (2006.01)
  *H04N 11/02* (2006.01)
(52) U.S. Cl. .................. 375/240.12; 348/400
(58) Field of Classification Search ............... 348/607, 348/726, 21, 558, 398, 413, 415, 416, 405, 348/402, 699, 700, 409, 411, 420, 384, 390, 348/400, 401, 407, 410, 412; 382/232, 234, 382/236, 233, 250, 238, 282; 375/240.17, 375/240, 240.25, 240.16, 240.12, 240.01, 375/240.26, 240.24, 240.18
See application file for complete search history.

(56) References Cited

U.S. PATENT DOCUMENTS

| | | | | |
|---|---|---|---|---|
| 5,530,481 | A * | 6/1996 | De With et al. | 375/240.12 |
| 5,907,500 | A * | 5/1999 | Nadehara | 708/700 |
| 6,052,706 | A * | 4/2000 | Wheeler et al. | 708/631 |
| 6,289,053 | B1 * | 9/2001 | Varanasi et al. | 375/240.17 |
| 6,868,123 | B2 * | 3/2005 | Bellas et al. | 375/240.16 |
| 6,970,504 | B1 * | 11/2005 | Kranawetter et al. | 375/240 |
| 7,035,890 | B2 * | 4/2006 | Fandrianto et al. | 708/523 |
| 2003/0105793 | A1 * | 6/2003 | Guttag et al. | 708/625 |
| 2006/0098736 | A1 * | 5/2006 | Guevorkian et al. | 375/240.12 |

* cited by examiner

*Primary Examiner* — Behrooz Senfi

(74) *Attorney, Agent, or Firm* — Muncy, Geissler, Olds & Lowe, PLLC

(57) ABSTRACT

An intra prediction circuit device applied to the H.264 video coding standard is provided. The intra prediction device uses a method of decreasing the repeated operations of the shared terms of the video pixel data to reduce the circuit computation and simplify the hardware architecture. In the intra prediction scheme, the computational complexity can be lessened by implementing not only the adder based method but also decomposition technique to simplify the algorithm of the intra prediction.

21 Claims, 18 Drawing Sheets

| | L, p(-1,3) | K, p(-1,2) | J, p(-1,1) | I, p(-1,0) | X, p(-1,-1) | A, p(0,-1) | B, p(1,-1) | C, p(2,-1) | D, p(3,-1) | E, p(4,-1) | F, p(5,-1) | G, p(6,-1) | H, p(7,-1) | Rounding | Shift |
|---|---|---|---|---|---|---|---|---|---|---|---|---|---|---|---|
| a, Po(0,0) | | | | | | 1 | | | | | | | | | |
| b, Po(1,0) | | | | | | | 2 | 1 | | | | | | 2 | >>2 |
| e, Po(0,1) | | | | | | | 1 | 2 | | | | | | 2 | >>2 |
| c, Po(2,0) | | | | | | | 1 | 2 | 1 | | | | | 2 | >>2 |
| f, Po(1,1) | | | | | | | | 1 | 2 | 1 | | | | 2 | >>2 |
| i, Po(0,2) | | | | | | | | 1 | 2 | 1 | | | | 2 | >>2 |
| d, Po(3,0) | | | | | | | | | 1 | 2 | 1 | | | 2 | >>2 |
| g, Po(2,1) | | | | | | | | | 1 | 2 | 1 | | | 2 | >>2 |
| j, Po(1,2) | | | | | | | | | 1 | 2 | 1 | | | 2 | >>2 |
| m, Po(0,3) | | | | | | | | | 1 | 2 | 1 | | | 2 | >>2 |
| h, Po(3,1) | | | | | | | | | | 1 | 2 | 1 | | 2 | >>2 |
| k, Po(2,2) | | | | | | | | | | 1 | 2 | 1 | | 2 | >>2 |
| n, Po(1,3) | | | | | | | | | | 1 | 2 | 1 | | 2 | >>2 |
| l, Po(3,2) | | | | | | | | | | | 1 | 2 | 1 | 2 | >>2 |
| o, Po(2,3) | | | | | | | | | | | 1 | 2 | 1 | 2 | >>2 |
| p, Po(3,3) | | | | | | | | | | | 1 | 1 | 3 | 2 | >>2 |

Figure 1

| | L | K | J | I | X | A | B | C | D | E | F | G | H | H' | Rounding | Shift |
|---|---|---|---|---|---|---|---|---|---|---|---|---|---|---|---|---|
| a | | | | | | 1 | | | | | | | | | 2 | >>2 |
| b | | | | | | | 2 | 1 | | | | | | | 2 | >>2 |
| e | | | | | | | 1 | 2 | 1 | | | | | | 2 | >>2 |
| c | | | | | | | 1 | 2 | 1 | | | | | | 2 | >>2 |
| f | | | | | | | | 1 | 2 | 1 | | | | | 2 | >>2 |
| i | | | | | | | | 1 | 2 | 1 | | | | | 2 | >>2 |
| d | | | | | | | | 1 | 2 | 1 | | | | | 2 | >>2 |
| g | | | | | | | | | 1 | 2 | 1 | | | | 2 | >>2 |
| j | | | | | | | | | 1 | 2 | 1 | | | | 2 | >>2 |
| m | | | | | | | | | 1 | 2 | 1 | | | | 2 | >>2 |
| h | | | | | | | | | | 1 | 2 | 1 | | | 2 | >>2 |
| k | | | | | | | | | | 1 | 2 | 1 | | | 2 | >>2 |
| n | | | | | | | | | | 1 | 2 | 1 | | | 2 | >>2 |
| l | | | | | | | | | | | 1 | 2 | 1 | | 2 | >>2 |
| o | | | | | | | | | | | 1 | 2 | 1 | | 2 | >>2 |
| p | | | | | | | | | | | | 1 | 2 | 1 | 2 | >>2 |

Figure 2

|   | L | K | J | I | X | A | B | C | D | E | F | G | H | H' | Rounding | Shift |
|---|---|---|---|---|---|---|---|---|---|---|---|---|---|---|---|---|
| a |   |   |   |   |   | 1 | 2 | 1 |   |   |   |   |   |   | 2 | >>2 |
| b,e |   |   |   |   |   |   | 1 | 2 | 1 |   |   |   |   |   | 2 | >>2 |
| c,f,i |   |   |   |   |   |   |   | 1 | 2 | 1 |   |   |   |   | 2 | >>2 |
| d,g,j,m |   |   |   |   |   |   |   |   | 1 | 2 | 1 |   |   |   | 2 | >>2 |
| h,k,n |   |   |   |   |   |   |   |   |   | 1 | 2 | 1 |   |   | 2 | >>2 |
| l,o |   |   |   |   |   |   |   |   |   |   | 1 | 2 | 1 |   | 2 | >>2 |
| p |   |   |   |   |   |   |   |   |   |   |   | 1 | 2 | 1 | 2 | >>2 |

Figure 3

| L | K | J | I | X | A | B | C | D | E | F | G | H | H' | Rounding | Shift | Cycle |
|---|---|---|---|---|---|---|---|---|---|---|---|---|----|----------|-------|-------|
|   |   |   |   |   | 1 | 1 |   |   |   |   |   |   |    |          |       | 1 |
| a |   |   |   |   |   |   |   |   |   |   |   |   |    |          |       |   |
|   |   |   |   |   |   | 1 | 1 |   |   |   |   |   |    | 2        | >>2   | 2 |
| b,e |   |   |   |   |   |   |   |   |   |   |   |   |    |          |       |   |
|   |   |   |   |   |   |   | 1 | 1 |   |   |   |   |    | 2        | >>2   | 3 |
| c,f,i |   |   |   |   |   |   |   |   |   |   |   |   |    |          |       |   |
|   |   |   |   |   |   |   |   | 1 | 1 |   |   |   |    | 2        | >>2   | 4 |
| d,g,j,m |   |   |   |   |   |   |   |   |   |   |   |   |    |          |       |   |
|   |   |   |   |   |   |   |   |   | 1 | 1 |   |   |    | 2        | >>2   | 5 |
| h,k,n |   |   |   |   |   |   |   |   |   |   |   |   |    |          |       |   |
|   |   |   |   |   |   |   |   |   |   | 1 | 1 |   |    | 2        | >>2   | 6 |
| l,o |   |   |   |   |   |   |   |   |   |   |   |   |    |          |       |   |
|   |   |   |   |   |   |   |   |   |   |   | 1 | 1 |    | 2        | >>2   | 7 |
| p |   |   |   |   |   |   |   |   |   |   |   |   |    |          |       |   |
|   |   |   |   |   |   |   |   |   |   |   |   | 1 | 1  | 2        | >>2   | 8 |

Figure 4

| I4MB Mode | Out put | L | K | J | I | X | A | B | C | D | E | F | G | H | H' | Rounding | Shift | Cycle |
|---|---|---|---|---|---|---|---|---|---|---|---|---|---|---|---|---|---|---|
| Vertical | a,e,i,m | | | | | | 1 | | | | | | | | | 0 | 0 | 1 |
| | b,f,j,n | | | | | | | 1 | | | | | | | | 0 | 0 | 2 |
| | c,g,k,o | | | | | | | | 1 | | | | | | | 0 | 0 | 3 |
| | d,h,l,p | | | | | | | | | 1 | | | | | | 0 | 0 | 4 |

Figure 5

| I4MB Mode | Out put | L | K | J | I | X | A | B | C | D | E | F | G | H | H' | Rounding | Shift | Cycle |
|---|---|---|---|---|---|---|---|---|---|---|---|---|---|---|---|---|---|---|
| Horizontal | a,b,c,d | | | | 1 | | | | | | | | | | | 0 | 0 | 1 |
| | e,f,g,h | | | 1 | | | | | | | | | | | | 0 | 0 | 2 |
| | i,j,k,l | | 1 | | | | | | | | | | | | | 0 | 0 | 3 |
| | m,n,o,p | 1 | | | | | | | | | | | | | | 0 | 0 | 4 |

Figure 6

| I4MB Mode | Out put | L | K | J | I | X | A | B | C | D | E | F | G | H | H | Rounding | Shift Cycle |
|---|---|---|---|---|---|---|---|---|---|---|---|---|---|---|---|---|---|
| DC |  |  |  |  |  |  | 1 |  |  |  |  |  |  |  |  | 0 | 1 |
|  |  |  |  |  |  |  |  | 1 |  |  |  |  |  |  |  | 0 | 2 |
|  |  |  |  | 1 |  |  |  |  | 1 |  |  |  |  |  |  | 0 | 3 |
|  | All | 1 | 1 |  |  |  |  |  |  | 1 |  |  |  |  |  |  | 4 |

Figure 7

| I4MB Mode | Output | L | K | J | I | X | A | B | C | D | E | F | G | H | H' | Rounding | Shift | Cycle |
|---|---|---|---|---|---|---|---|---|---|---|---|---|---|---|---|---|---|---|
| Diagonal down left |  |  |  |  |  |  | 1 | 1 |  |  |  |  |  |  |  | 0 | 0 | 1 |
|  | a |  |  |  |  |  |  | 1 | 1 |  |  |  |  |  |  | 2 | >>2 | 2 |
|  | b,e |  |  |  |  |  |  |  | 1 | 1 |  |  |  |  |  | 2 | >>2 | 3 |
|  | c,f,i |  |  |  |  |  |  |  |  | 1 | 1 |  |  |  |  | 2 | >>2 | 4 |
|  | d,g,j,m |  |  |  |  |  |  |  |  |  | 1 | 1 |  |  |  | 2 | >>2 | 5 |
|  | h,k,n |  |  |  |  |  |  |  |  |  |  | 1 | 1 |  |  | 2 | >>2 | 6 |
|  | l,o |  |  |  |  |  |  |  |  |  |  |  | 1 | 1 |  | 2 | >>2 | 7 |
|  | p |  |  |  |  |  |  |  |  |  |  |  |  | 1 | 1 | 2 | >>2 | 8 |

Figure 8

| I4MB Mode | Output | L | K | J | I | X | A | B | C | D | E | F | G | H | H' | Rounding | Shift | Cycle |
|---|---|---|---|---|---|---|---|---|---|---|---|---|---|---|---|---|---|---|
| Diagonal down right | | | | | | | | | | 1 | | | | | | 0 | 0 | 1 |
| | d | | | | | | | 1 | 1 | | | | | | | 2 | >>2 | 2 |
| | c,h | | | | | 1 | 1 | | | | | | | | | 2 | >>2 | 3 |
| | b,g,l | | | | 1 | 1 | | | | | | | | | | 2 | >>2 | 4 |
| | a,f,k,p | | | 1 | 1 | | | | | | | | | | | 2 | >>2 | 5 |
| | e,j,o | | 1 | 1 | | | | | | | | | | | | 2 | >>2 | 6 |
| | i,n | 1 | 1 | | | | | | | | | | | | | 2 | >>2 | 7 |
| | m | 1 | | | | | | | | | | | | | | 2 | >>2 | 8 |

Figure 9

| I4MB Mode | Out put | L | K | J | I | X | A | B | C | D | E | F | G | H | H' | Rounding | Shift | Cycle |
|---|---|---|---|---|---|---|---|---|---|---|---|---|---|---|---|---|---|---|
| Vertical right | d | | | | | | | | 1 | 1 | | | | | | 0 | 0 | 1 |
| | h,c,l | | | | | | 1 | 1 | 1 | | | | | | | 2 | >>2 | 2 |
| | g,p,b,k | | | | | 1 | 1 | 1 | | | | | | | | 2 | >>2 | 3 |
| | f,o,a,j | | | | 1 | 1 | 1 | | | | | | | | | 2 | >>2 | 4 |
| | e,n | | | 1 | 1 | 1 | | | | | | | | | | 2 | >>2 | 5 |
| | i | | 1 | 1 | 1 | | | | | | | | | | | 2 | >>2 | 6 |
| | m | 1 | 1 | 1 | | | | | | | | | | | | 2 | >>2 | 7 |

Figure 10

| I4MB Mode | Out put | L | K | J | I | X | A | B | C | D | E | F | G | H | H' | Rounding | Shift | Cycle |
|---|---|---|---|---|---|---|---|---|---|---|---|---|---|---|---|---|---|---|
| Horizontal down |  |  |  |  |  |  |  |  | 1 |  |  |  |  |  |  | 0 | 0 | 1 |
|  | d |  |  |  |  |  | 1 | 1 | 1 |  |  |  |  |  |  | 2 | >>2 | 2 |
|  | c |  |  |  |  | 1 | 1 | 1 |  |  |  |  |  |  |  | 2 | >>2 | 3 |
|  | b,h,a,g |  |  |  | 1 | 1 |  |  |  |  |  |  |  |  |  | 2 | >>2 | 4 |
|  | f,l,e,k |  |  | 1 | 1 |  |  |  |  |  |  |  |  |  |  | 2 | >>2 | 5 |
|  | j,p,i,o |  | 1 | 1 |  |  |  |  |  |  |  |  |  |  |  | 2 | >>2 | 6 |
|  | n,m | 1 | 1 |  |  |  |  |  |  |  |  |  |  |  |  | 2 | >>2 | 7 |

Figure 11

| I4MB Mode | Out put | L | L | K | J | I | X | A | B | C | D | E | F | G | H | H' | Rounding | Shift | Cycle |
|---|---|---|---|---|---|---|---|---|---|---|---|---|---|---|---|---|---|---|---|
| Vertical left | a |  |  |  |  |  |  | 1 | 1 |  |  |  |  |  |  |  | 0 | 0 | 1 |
|  | e,b,i |  |  |  |  |  |  |  | 1 | 1 |  |  |  |  |  |  | 2 | >>2 | 2 |
|  | f,m,c,j |  |  |  |  |  |  |  |  | 1 | 1 |  |  |  |  |  | 2 | >>2 | 3 |
|  | g,n,d,k |  |  |  |  |  |  |  |  |  | 1 | 1 |  |  |  |  | 2 | >>2 | 4 |
|  | h,o,l |  |  |  |  |  |  |  |  |  |  | 1 | 1 | 1 |  |  | 2 | >>2 | 5 |
|  | p |  |  |  |  |  |  |  |  |  |  |  | 1 | 1 |  |  | 2 | >>2 | 6 |

Figure 12

| I4MB Mode | Out put | L | L | K | J | I | X | A | B | C | D | E | F | G | H | H' | Rounding | Shift | Cycle |
|---|---|---|---|---|---|---|---|---|---|---|---|---|---|---|---|---|---|---|---|
| Horizontal down | a | | | | 1 | 1 | | | | | | | | | | | 0 | 0 | 1 |
| | b,c,e | | | 1 | 1 | | | | | | | | | | | | 2 | >>2 | 2 |
| | d,f,g,i | | 1 | 1 | | | | | | | | | | | | | 2 | >>2 | 3 |
| | h,j,k,l,m | 1 | 1 | | | | | | | | | | | | | | 2 | >>2 | 4 |

Figure 13

INTRA PREDICTION CIRCUIT DEVICE APPLIED TO THE H.264 VIDEO CODING STANDARD

BACKGROUND

1. Field of Invention

The present invention relates to a prediction circuit of a video system, and more particularly to an intra prediction circuit device applied to the H.264 video coding standard.

2. Description of Related Art

Recent development of MPEG2, MP3, VCD and DVD multimedia products have made H.264 and MPEG4 video coding functions with higher video quality compression rates, lower bit rates and simplified programs be a basic requirement for multimedia products. Moreover, H.264 and MPEG4 video coding functions further include higher integrated communication capability. As a result, the H.264 and MPEG4 video coding functions are generally applied to digital video products.

The H.264 and MPEG4 technologies are broadly implemented on digital video equipments with high-density stored image requirement such as digital monitor systems, digital cameras, digital DV recorders, portable MPEG4 (DivX) multimedia players, portable mobile digital video recorders (DVR), digital video broadcasting (DVB), set-top-boxes (STB) and so on. Furthermore, the MPEG4 PVR with video on Demand (VOD) has been applied to the IP STB (Internet) to enhance the resolution of the digital television.

H.264/AVC (Advanced Video Coding) is the video compression standard established by the Video Coding Experts Group (VCEG) of ITU-T and the Moving Picture Experts Group (MPEG) of International Organization for Standardization (ISO)/International Electrotechnical Commission (IEC). Compared with the previous video standard MPEG, H.264 provides a compression quality with approximately double the compression rate.

The H.264/AVC video standard consists of many modes, wherein the intra prediction mode plays an important role to enhance the compression rate of the still images. There are nine kinds of formats with 4×4 blocks and four kinds of formats with 16×16 macroblocks in the intra prediction mode of the H.264 where these thirteen prediction modes are applied to video coding to enhance the compression rate of the images. Compared with the compression quality of the still images in accordance with the prior art, the peak signal to noise ratio (PSNR) value is about 0.1-0.8 db higher than the JEPG-2000 DWT53. In order to achieve the higher resolution, immediate intra prediction and immediate coding, decreasing the computation to enhance efficiency and output rate is a critical issue.

SUMMARY

It is therefore an objective of the present invention to provide an intra prediction circuit device applied to the H.264 video coding standard wherein the simplified algorithm can find the characteristic of the shared terms to decrease the operations of the shared terms. Thus, this method of decreasing the repeated operations of the shared terms can reduce the computation.

It is another objective of the present invention to provide an intra prediction circuit device applied to the H.264 video coding standard wherein the added decomposition technique can simplify the computational complexity of the algorithm to implement the adder based prediction circuit device in intra 16×16 macroblock/chroma 8×8 macroblock (I16MB/C8MB) plane modes.

In accordance with the foregoing and other objectives of the present invention, an intra prediction circuit device applied to the H.264 video coding standard is provided. The intra prediction device uses a method of decreasing the repeated operations of the shared terms of the video pixel data to reduce the circuit computation and simplify the hardware architecture.

The prediction circuit device includes a first arithmetic operation unit, a register, a first multiplexer, a second arithmetic operation unit, a logic right shift unit and a post register. The first arithmetic operation unit transforms pixel data with rebuilding surrounding sides to bit data. The register stores the bit data. The first multiplexer decodes the bit data stored in the register. The second arithmetic operation unit computes the bit data computed from the first arithmetic operation unit with the bit data of the first multiplexer to store the shared terms in the register to decrease the repeated computations of the shared terms. The logic right shift unit logically right shifts the bit data computed from the second arithmetic operation unit. The post register stores the bit data after logically right shifting. Thus, all prediction modes of the H.264 video coding standard based on the adders can be implemented by this prediction circuit to provide an intra prediction circuit with lower computation and complexity.

In the intra prediction circuit device, the simplified algorithm can determine the characteristic of the shared terms to decrease the repeated operations of the shared terms and reduce the computation. Moreover, the prediction circuit can implement the operation on the basis of the adder with the added decomposition technique to reduce the complexity. Therefore, the shared adder-based architecture is proposed to support all intra prediction modes of the H.264 video coding standard such that the hardware utility is enhanced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings, FIG. 1 shows a shared adder based algorithm table which illustrates the initial shared input value and the initial shared output value generating output efficiency;

FIG. 2 shows a similar table in accordance with FIG. 1 which illustrates the prediction value with re-arranged filtering coefficient generating output efficiency;

FIG. 3 shows a similar table in accordance with FIG. 1 which illustrates the prediction value after combining the shared terms in FIG. 2;

FIG. 4 shows a similar table in accordance with FIG. 1 which illustrates the prediction value after simplifying the shared terms;

FIG. 5 shows an I4MB prediction mode result table which illustrates the vertical value of the video pixel data;

FIG. 6 shows an I4MB prediction mode result table which illustrates the horizontal value of the video pixel data;

FIG. 7 shows an I4MB prediction mode result table which illustrates the DC value of the video pixel data;

FIG. 8 shows an I4MB prediction mode result table after the shared term algorithm which illustrates the diagonal down left value of the video pixel data;

FIG. 9 shows an I4MB prediction mode result table after the shared term algorithm which illustrates the diagonal down right value of the video pixel data;

FIG. 10 shows an I4MB prediction mode result table after the shared term algorithm which illustrates the vertical right value of the video pixel data;

FIG. 11 shows an I4MB prediction mode result table after the shared term algorithm which illustrates the horizontal down value of the video pixel data;

FIG. 12 shows an I4MB prediction mode result table after the shared term algorithm which illustrates the vertical left value of the video pixel data;

FIG. 13 shows an I4MB prediction mode result table after the shared term algorithm which illustrates the horizontal down value of the video pixel data;

DESCRIPTION OF THE PREFERRED EMBODIMENTS

Figure 14:
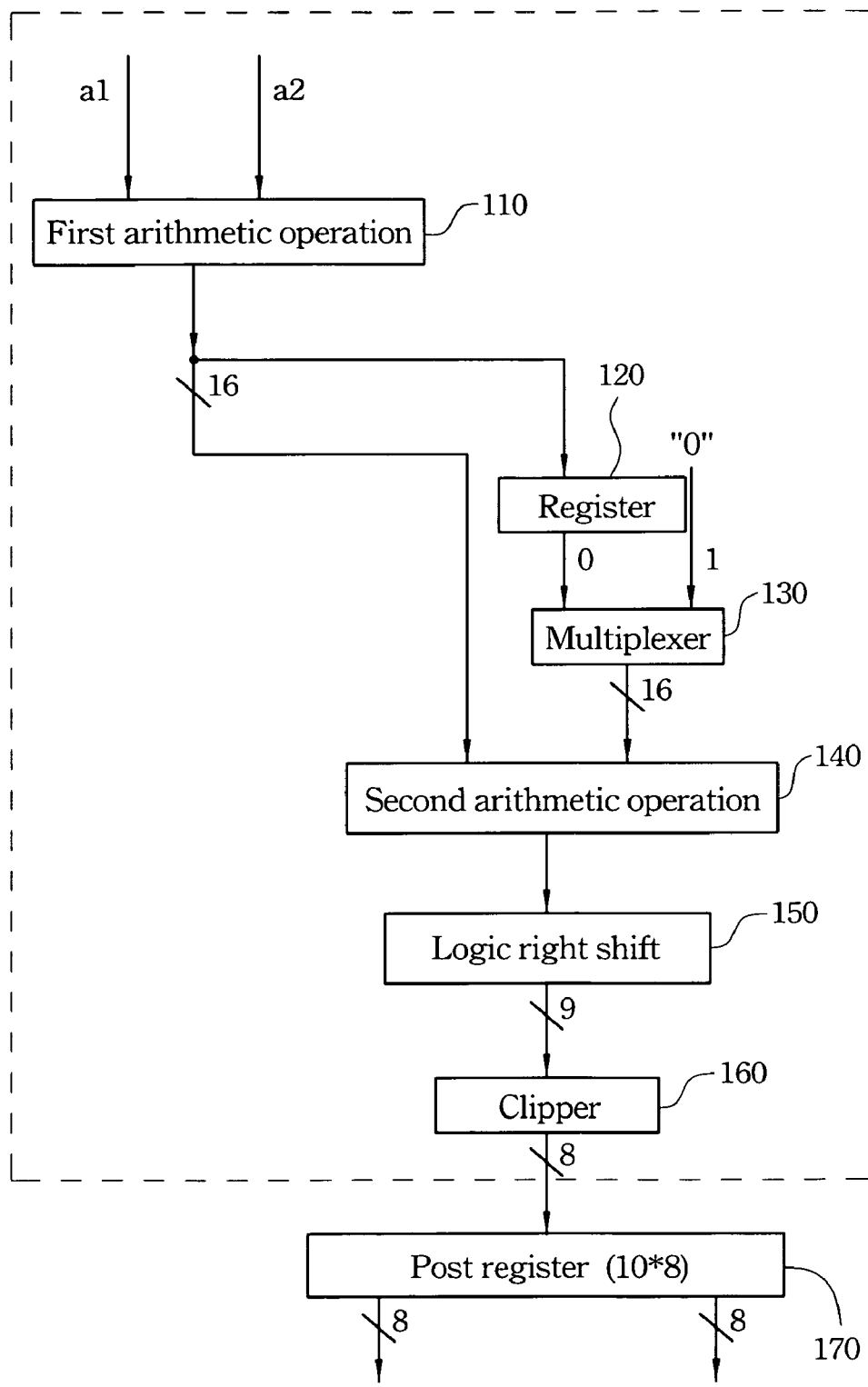
FIG. 14 shows a flow chart which illustrates a prediction circuit performing the I4MB prediction modes of FIG. 8 to FIG. 13 of the embodiment.

Reference will now be made in detail to the present preferred embodiments of the invention, examples of which are illustrated in the accompanying drawings. Wherever possible, the same reference numbers are used in the drawings and the description to refer to the same or like parts.

While the specification concludes with claims defining the features of the invention that are regarded as novel, it is believed that the invention will be better understood from a consideration of the following description in conjunction with the figures, in which like reference numerals are carried forward.

In the intra prediction circuit device applied to the H.264 video coding standard of the present invention, the algorithms of intra prediction of H.264 video coding standard include three prediction modes, I4MB (illumination of the pixel data), I16MB (illumination of the pixel data) and C8MB (chroma of the pixel data). Moreover, there are nine modes in I4MB, four modes in I16MB and four modes in C8MB. The algorithm supporting I16MB can also be implemented to C8MB because the I16MB and the C8MB have same operations. Besides, the vertical mode, the horizontal mode and the DC mode of the I4MB are similar with the vertical mode, the horizontal mode and the DC mode of the I16MB, so the three modes of the I16MB can be divided into sixteen I4MB modes to perform, and the working mode can also be simplified into ten modes to analyze.

Refer to FIG. 1, FIG. 2, FIG. 3 and FIG. 4, which respectively illustrate the shared adder based algorithm table. FIG. 1 illustrates the initial shared input value and the initial shared output value generating output efficiency.

In the algorithms of the intra prediction in the H.264 video coding standard, an algorithm of a diagonal down left prediction mode in the I4MB is shown as the following equation 1:

$$
\begin{aligned}
&\text{If } (x == 3 \text{ and } y == 3) \\
&\quad Po[x,y]= (p[6,-1]+ 3 * p[7,-1]+ 2) >> 2 \\
&\text{Else}(x!= 3 \;||\; Y!= 3) \\
&\quad Po[x,y]= (p[x + y,-1]+ 2 * p[x + y + 1,-1]+ p[x + y + 2, -1] + 2) >> 2
\end{aligned} \quad (1)
$$

(where [x,y] is the position)

Reference is made to FIG. 1 and formula 1, a plurality of horizontal symbols, A, B, C, D, E, F, G, H, I, J, K, L, and X in FIG. 1 are defined as the input values, and a plurality of vertical symbols, a, b, c, d, e, f, g, h, i, j, k, l, m, n, o, and p are defined as the output prediction values. A plurality of the numerals [1, 2, 1] denote the weighting value of the input video pixel date; a plurality of the numerals, .[2] denote the offset rounding values; [>>2] denotes the shifting activity.

Refer to FIG. 1, two or three input surrounding pixels (A to L) are computed with one multiplication algorithm and two addition algorithms to form output pixels (a to p) after the analysis. In the first cycle, the output prediction value a is set as A+2B+C; in the second cycle, the output prediction value b is set as B+2C+D; in the third cycle, the output prediction value e is set as B+2C+D; in the fourth cycle, the output prediction value c is set as C+2D+E; in the fifth cycle, the output prediction value f is set as C+2D+E; in the sixth cycle, the output prediction value i is set as C+2D+E; in the seventh cycle, the output prediction value d is set as D+2E+F; in the eighth cycle, the output prediction value g is set as D+2E+F; in the ninth cycle, the output prediction value j is set as D+2E+F; in the tenth cycle, the output prediction value m is set as D+2E+F; in the eleventh cycle, the output prediction value h is set as E+2F+G; in the twelfth cycle, the output prediction value k is set as E+2F+G; in the thirteenth cycle, the output prediction value n is set as E+2F+G; in the fourteenth cycle, the output prediction value I is set as F+2G+H; in the fifteenth cycle, the output prediction value o is set as F+2G+H; and in the sixteenth cycle, the output prediction value p is set as G+3H. The output prediction value p (p=G+3H) in vertical can be decomposed to p=G+2H+H. Therefore, the weighting values of a to p are all the same such that the computation of the prediction value can be implemented with just one piece of hardware.

Refer to FIG. 2. FIG. 2 illustrates the prediction value with a re-arranged filtering coefficient generating output efficiency in accordance with FIG. 1. A new input value "H'" (H'=H) is added in accordance with the rearranged output order. In this table, the prediction value "b" and the prediction value "e" in the vertical have the same computation result (b=e=B+2C+D). The prediction "c", the prediction "f" and the prediction "i" also have the same computation result (c=f=i=C+2D+E). Therefore, a plurality of shared terms are provided in a 4×4 block consisting of sixteen prediction values. As a result, diminishing the repeat operations of the shared terms can reduce the computations and simplify the hardware to save the cost.

Refer to FIG. 3. FIG. 3 illustrates the prediction value after combining the shared terms in FIG. 2. After combining the shared terms, the repeat computations of the shared terms are diminished. In other words, the prediction value "a" belongs to a single term (A+2B+C), the prediction values "b, e" combine into a single term (B+2C+D), the prediction values "c, f, i" combine into a single term (C+2D+E), the prediction values "d, g, j, m" combine into a single term (D+2E+F), the prediction values "h, k, n" combine into a single term (E+2F+G), the prediction values "l, o" combine into a single term (F+2G+H) and the prediction value "p" belongs to a single term (G+2H+H'). Thus, the computation period of these seven cycles is less than the computation period of the sixteen cycles wherein each prediction value belongs to a single term in FIG. 1 and FIG. 2. Moreover, applying this shared terms computation method to hardware design can reduce about 56 percent of the computation.

In FIG. 3, the prediction value "a" is computed by A+2B+C, and can also be computed by (A+B)+(B+C) decomposed from A+2B+C. The prediction value "b" is computed by B+2C+D, and can also be computed by (B+C)+(C+D) decomposed from B+2C+D. Therefore, this feature of the shared terms, (B+C) can also be used to reduce the computation.

Refer to FIG. 4. FIG. 4 illustrates the prediction value after simplifying the shared terms. Before the prediction value "a" and the prediction value "b" are computed, the value (A+B) is computed in the first cycle of the initial term and the result value of (A+B) is stored in a register. In the second cycle of the prediction value "a", the values of (B+C) and (A+B)+(B+C) are computed simultaneously, and the result value of (B+C) is stored in the register. In the third cycle of the prediction value "b", the values of (C+D) and (B+C)+(C+D) are computed simultaneously, and the result value of (C+D) is stored in the register and so forth, a 4×4 block (diagonal down left prediction mode) prediction mode is provided.

This method uses the shared terms method. Only sixteen additions (sixteen "1" wherein each of these "1" is computed with an addition in FIG. 4) and eight cycles (cycle 1 to cycle 8) are used in the diagonal down left prediction mode. In FIG. 4, eight computation steps substitute sixteen multiplications (sixteen "2" wherein each of these "2" is computed with a multiplication) and thirteen additions (adding each of the group "1, 2, 1" of the prediction values "a" to "p", (A+2B+C), (B+2C+D), (C+2D+E), (D+2E+F), (E+2F+G), (F+2G+H), (G+3H), and there are thirteen additions) and sixteen cycles (sixteen steps of computations in FIG. 2). As a result, this method that uses the shared terms feature reduces the computation and shortens the computation period.

FIG. 8 to FIG. 13 individually illustrate the computation results of the algorithms after simplifying the shared terms in the I4MB prediction mode consisting of the blocks made of a 4×4 block (sixteen prediction values). FIG. 8 illustrates the computation result of the diagonal down left prediction mode, FIG. 9 illustrates the computation result of the diagonal down right prediction mode, FIG. 10 illustrates the computation result of the vertical right prediction mode, FIG. 11 illustrates the computation result of the horizontal down prediction mode, FIG. 12 illustrates the computation result of the vertical left prediction mode and FIG. 13 illustrates the computation result of the horizontal up prediction mode. In accordance with the analysis of FIG. 5 to FIG. 13, the algorithms of the I4MB prediction mode (luminance prediction mode) in FIG. 8 to FIG. 13 are almost the same and consists of two input pixel computations.

The computation results of FIG. 8 to FIG. 13 are similar to the diagonal down left prediction mode of FIG. 4. Therefore, this method of simplified shared terms can be used for the prediction modes in FIG. 8 to FIG. 13 to reduce the computation. Refer to the figures between FIG. 5 and FIG. 13, a single block is computed by only six cycles on average. Moreover, FIG. 14 is a flow chart which illustrates the embodiment of the prediction circuit device of the present invention. FIG. 14 stands a computation circuit used to process the luminance signal of the pixel in I4MB and apply to the prediction modes of FIG. 8 to FIG. 13.

Refer to FIG. 14. In the intra prediction circuit device of the H.264 video coding standard of the present invention, the circuit computation can be simplified by the video coding/decoding algorithm using the method of diminishing the repeat computations of the shared terms. As a result, a shared adder-based prediction circuit device is provided, and the prediction circuit device includes a first arithmetic operation unit 110, a register 120, a first multiplexer 130, a second arithmetic operation unit 140, a logic right shift unit 150, a clipper 160 and a post register 170.

The first arithmetic operation unit 110 transforms pixel data of a video to bit data, and the first arithmetic operation unit 110 in the embodiment is an adder. The register 120 is used to store the bit data, and the first multiplexer 130 is used to decode the bit data stored in the register 120.

The second arithmetic operation unit 140 is used to compute the bit data computed from the first arithmetic operation unit 110 and the bit data of the first multiplexer 130 to reduce the repeated computation of the shared terms. The second arithmetic operation unit 140 in this embodiment is an adder.

The logic right shift unit 150 shifting the bit data computed by the second arithmetic operation unit 140 in a logical right shift manner.

The clipper 160 is connected between the logic right shift unit 150 and the post register 170, and the clipper 160 is used to limit the pixel bit data computed by the logic right shift unit 150 in a value range 0 to 255. The post register 170 is used to store the bit data computed by the logic right shift unit 150, and the post register 170 needs ten bytes.

The algorithm with the shared terms can be implemented by the adder based intra prediction scheme with lower complexity in FIG. 14. A center circuit with two adders (the first arithmetic operation unit and the second arithmetic operation unit), one multiplexer (the first multiplexer 130) and one register 120 is used for computation in FIG. 4. The computation result of the prediction circuit is stored in the post register 170, and is outputted in order. The output port amount of the post register 170 is determined by the needed condition. In accordance with the analysis, at least two output ports are needed to limit the working frequency under 100 MHz.

In order to boost the hardware utility, the first step is to analyze how to support the vertical and the horizontal prediction modes by FIG. 14 flow chard (shared adder based architecture). In accordance with the result of the H.264 video compression standard algorithm, the input value is the same as the output value in these two prediction modes, vertical and the horizontal prediction modes, without any computation. Therefore, new route from input port to post register is needed to build in the FIG. 14.

Figure 15:
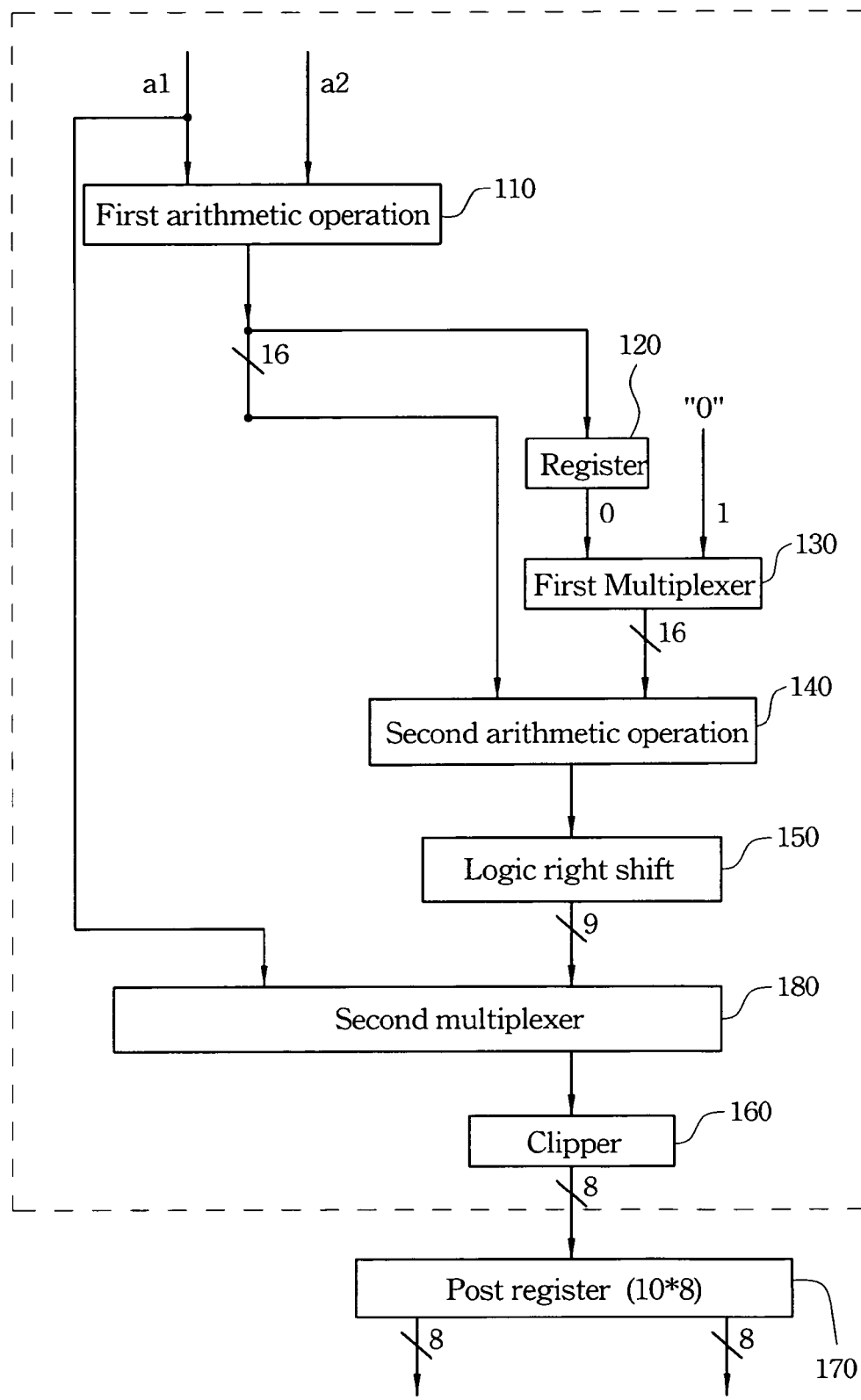
FIG. 15 shows a flow chart which illustrates the prediction circuit device supporting the vertical prediction mode and horizontal prediction mode in FIG. 5 and FIG. 6.

Refer to FIG. 15. FIG. 15 illustrates the prediction circuit device supporting the vertical prediction mode and horizontal prediction mode in FIG. 5 and FIG. 6 in accordance with FIG. 14. The prediction circuit device in FIG. 15 includes the identical first arithmetic operation unit 110, the register 120, the first multiplexer 130, the second arithmetic operation unit 140, the logic right shift unit 150, the clipper 160 and the post register 170 in FIG. 14. There is no more detailed description on the scheme because the scheme in FIG. 14 is identical to the scheme in FIG. 15. The difference between FIG. 14 and FIG. 15 is the added second multiplexer 180 connected between the logic right shift unit 150 and the clipper 160. The input port (a1) is directly selected by the second multiplexer 180 and stored in the post register 170. The signal stored in the post register 170 is outputted in order to support the computations of the vertical and horizontal prediction modes.

Figure 16:
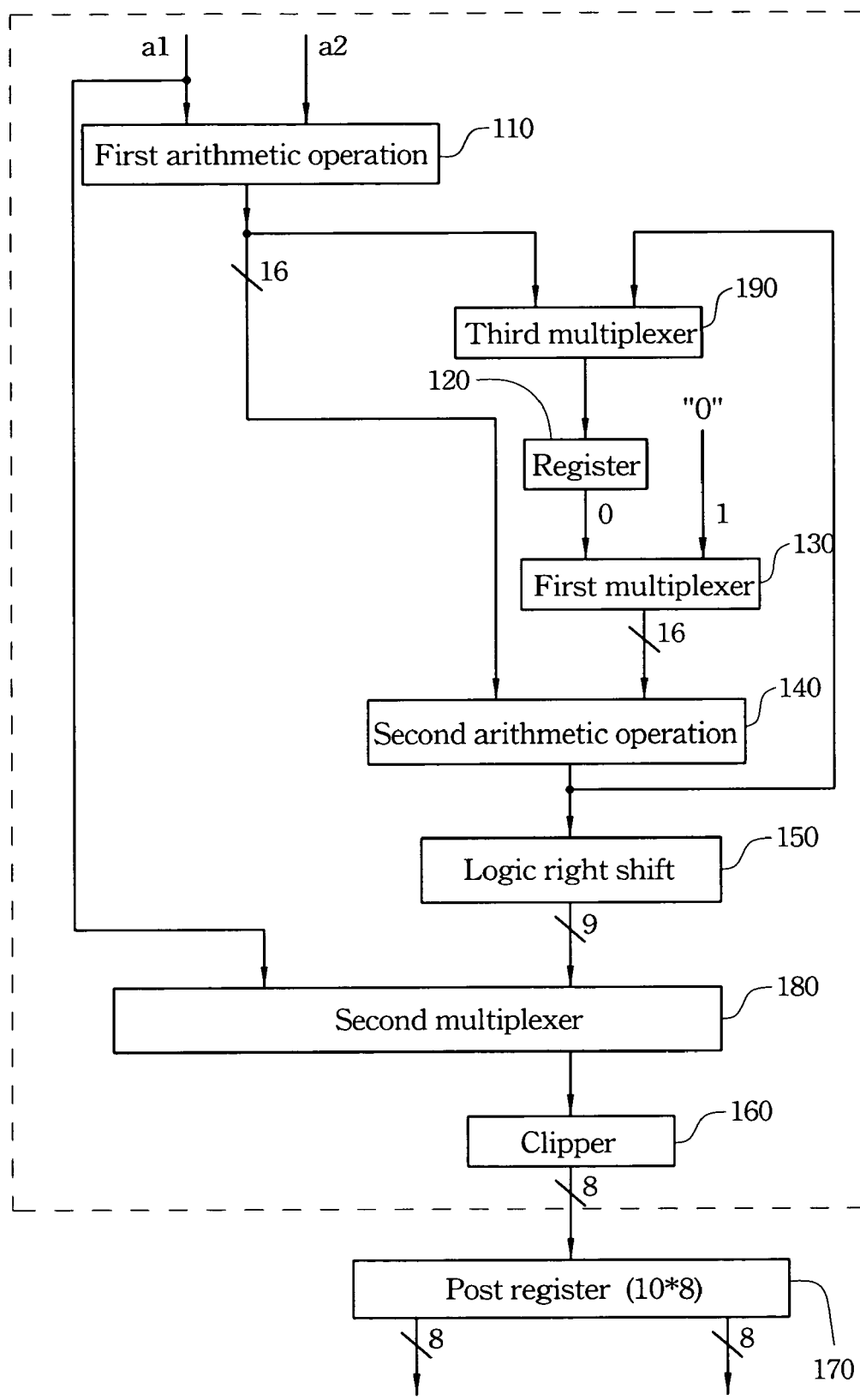
FIG. 16 shows a flow chart which illustrates the prediction circuit device supporting the DC value prediction mode in FIG. 7.

Refer to FIG. 16. FIG. 16 illustrates the prediction circuit device supporting the DC value prediction mode in FIG. 7. The difference between FIG. 15 and FIG. 16 is the added third multiplexer 190 connected between the output of the first arithmetic operation unit 110 and the output of the second arithmetic operation unit 140. In accordance with the analyzing result of the algorithm in FIG. 7, the output value is the average of all input values in this prediction mode. In the hardware circuit design, the average value is computed by accumulating all input values with the accumulator and computing with the shifter. Thus, the added third multiplexer 190 in FIG. 15 has the function of the accumulator such that the third multiplexer 190 and the logic right shift unit 150 can implement the computation of the DC prediction mode.

Figure 17:
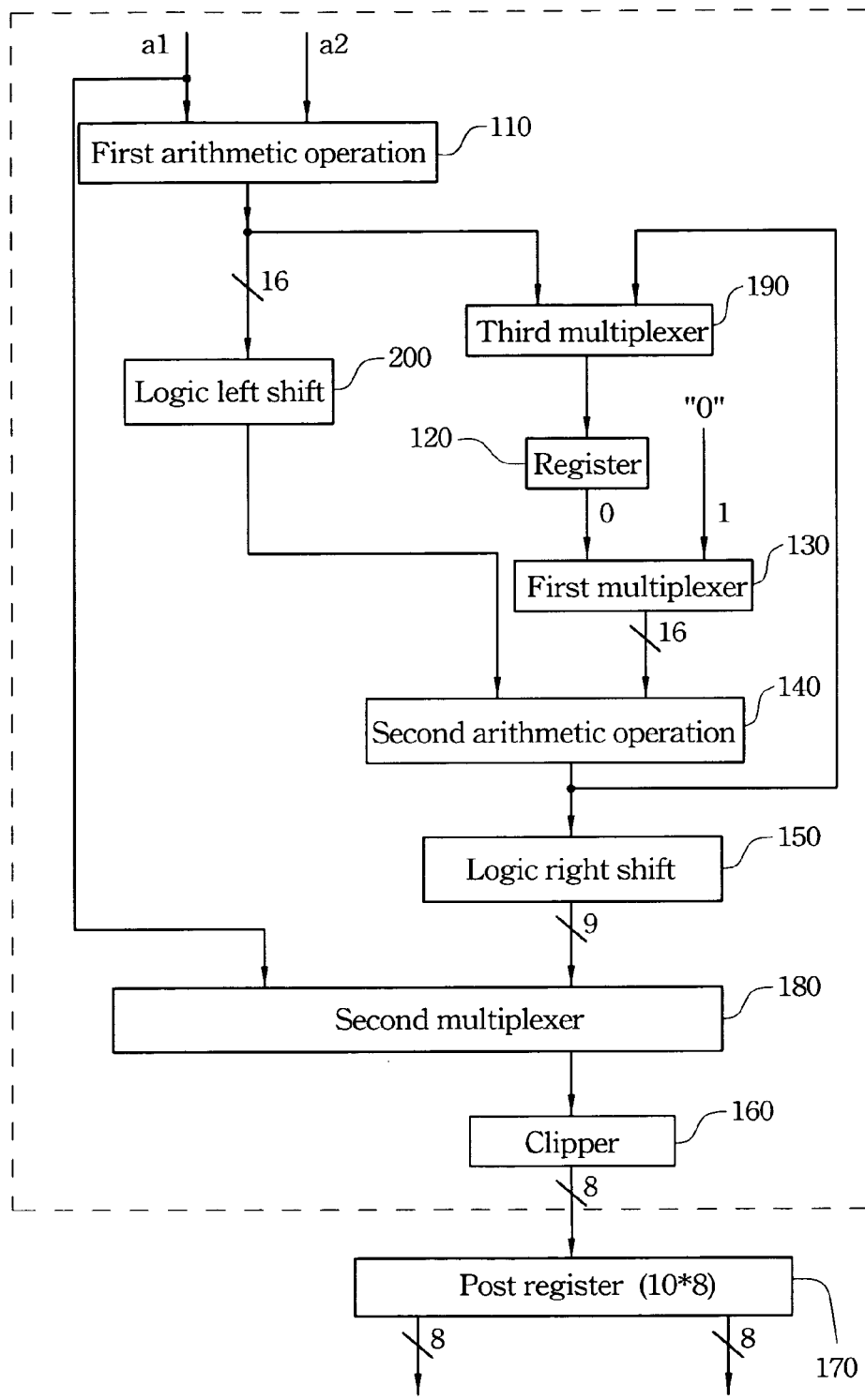
FIG. 17 shows a flow chart which illustrates the prediction circuit device supporting a plane prediction mode.

Refer to FIG. 17. FIG. 17 is a flow chart illustrating the circuit device supporting plane prediction mode and integrated in the adder based circuit. The algorithms in accordance with the H.264 video standard are presented as the following equations:

$$pred_L[x, y] = Clip1((a + b*(x - 7) + c*(y - 7) + 16) >> 5) \quad (2)$$

Where $$a = 16*(p[-1, 15] + p[15, -1]) \quad (3)$$

$$b = (5*H + 32) >> 6 \quad (4)$$

$$c = (5*V + 32) >> 6 \quad (5)$$

And $$H = \sum_{x'=0}^{7} (x' + 1)*(p[8 + x', -1] - p[6 - x', -1]) \quad (6)$$

$$V = \sum_{y'=0}^{7} (y' + 1)*(p[-1, 8 + y'] - p[-1, 6 - y']) \quad (7)$$

Wherein [x,y] denotes the corresponding address ($0 \leq x \leq 15$, $0 \leq y \leq 15$) of the pixel in a 16×16 macro block after the computation. The p denotes the rebuilt neighboring pixel. The [x', y'] denotes the address ($-1 \leq x' \leq 15$, $-1 \leq y' \leq 15$) of the neighboring pixel. Clip 1 denotes the computation result value limited among the range 0 to 255 bytes.

The following description illustrates how the adder based circuit decoding the high resolution image format HD1080i:

In accordance with the algorithm of the plane prediction mode, the computation order is to compute the horizontal and the vertical values, compute the a, b and c values, and combine the a, b and c values to figure all output values. After the analysis of how to compute the horizontal and the vertical values with the circuit of the present invention, the equation (8) can be substituted for the equation (6) by the decomposition formula. In order to prevent the use of the multiplier to compute with the circuit including the adders and the shifters, the equation (9) is substituted for the equation (8). Thus, only the operations of the addition, the subtraction, the left shifting and the accumulation are needed in the computation. The horizontal value H can be computed by subtraction of the subtracters, multiplication of the shifters, and accumulation of the accumulators wherein the shifters can be removed. In FIG. 17, a logic left shift unit 200 is added to enhance the computation efficiency. Besides, the horizontal value H can also be figured by the computation result of accumulating each value after the subtraction. Comparing the hardware in FIG. 16 and FIG. 17, the logic left shift unit 200 is added to figure the H value. Moreover, the first arithmetic operation unit 110 and the second arithmetic operation unit 140 have an additional subtraction function such that the H value can be figured with the first arithmetic operation unit 110, the second arithmetic operation unit 140 and the logic left shift unit 200. This method can also be used to figure the V (vertical) value because the operations between the V and H values are identical.

In the computation among the a, b and c values, the equation (3), equation (4) and equation (5) are redefined as the equation (10). In accordance with the computation result of equation (10), the a, b and c values can be figured with the adders and the accumulators. Therefore, using various control signals can implement the computations of the a, b and c values in the circuit of FIG. 17.

Figure 18:
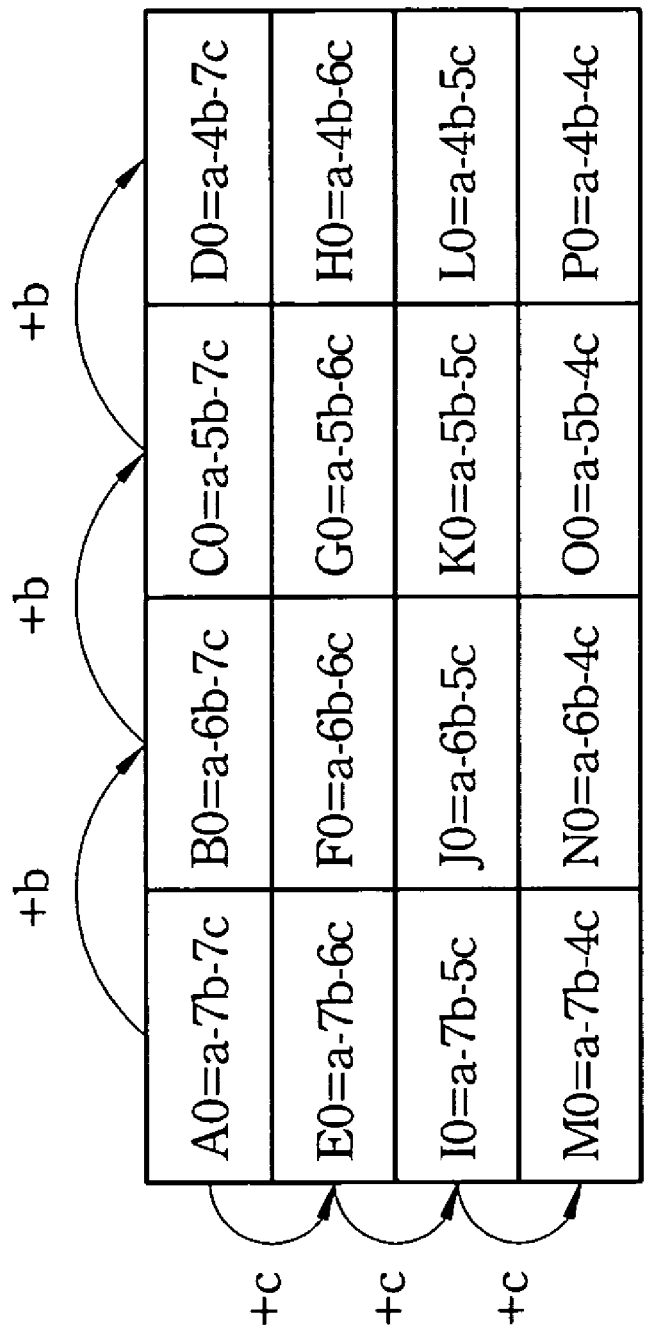
FIG. 18 shows an algorithm table which illustrates the decomposition technique of the plane prediction mode in I16MB.

Consequently, all output values can be figured by equation (2), but the operation of equation (2) is very complicated. After decomposing equation (2), a different relation of "b" or "c" between each adjacent output value is discovered, as shown in FIG. 18 and by equation (11), equation (12) and equation (13). In the 4×4 block, each output value has a difference value "b" regarding to its right adjacent output value, and a difference value "c" regarding to its lower adjacent output value. By this characteristic, calculating the "A0" value first, and then repeat adding the "b" value to calculating other right pixels in the same row and repeat adding the "c" value to calculating the other down pixels in the same column. As a result, the computation of an entire 16×16 macro block is provided.

$$H = 8*(Px[15] - Px[-1]) + 7*(Px[14] - Px[0]) + \quad (8)$$
$$6*(Px[13] - Px[1]) + 5*(Px[12] - Px[2]) + 4*(Px[11] - Px[3]) +$$
$$3*(Px[10] - Px[4]) + 2*(Px[9] - Px[5]) + (Px[8] - Px[6])$$

$$H = (Px[15] - Px[-1]) <<3 + (Px[14] - Px[0]) <<3 - \quad (9)$$
$$(Px[14] - Px[0]) + (Px[13] - Px[1]) <<2 +$$
$$(Px[13] - Px[1]) <<1 + (Px[12] - Px[2]) <<2 +$$
$$(Px[12] - Px[2]) + (Px[11] - Px[3]) <<2 + (Px[10] - Px[4]) <<1 +$$
$$(Px[10] - Px[4]) + (Px[9] - Px[5]) <<1 + (Px[8] - Px[6])$$

$$a = (p[-1, 15] + p[15, -1]) << 4 \quad (10)$$
$$b = (2(H + H) + H + 32) >> 6$$
$$c = (2(V + V) + V + 32) >> 6$$

$$A0 = pred[0, 0] = Clip1((a + b*(-7) + c*(-7) + 16) >> 5) \quad (11)$$
$$= Clip(A0) >> 5$$

$$B0 = pred[0, 1] \quad (12)$$
$$= Clip1((a + b*(-6) + c*(-7) + 16) >> 5) = Clip((B0) >> 5)$$
$$= Clip1((A0 + b) >> 5)$$

$$E0 = pred[1, 0] \quad (13)$$
$$= Clip1((a + b*(-7) + c*(-6) + 16) >> 5) = Clip((E0) >> 5)$$
$$= Clip1((A0 + c) >> 5)$$

Figure 19:
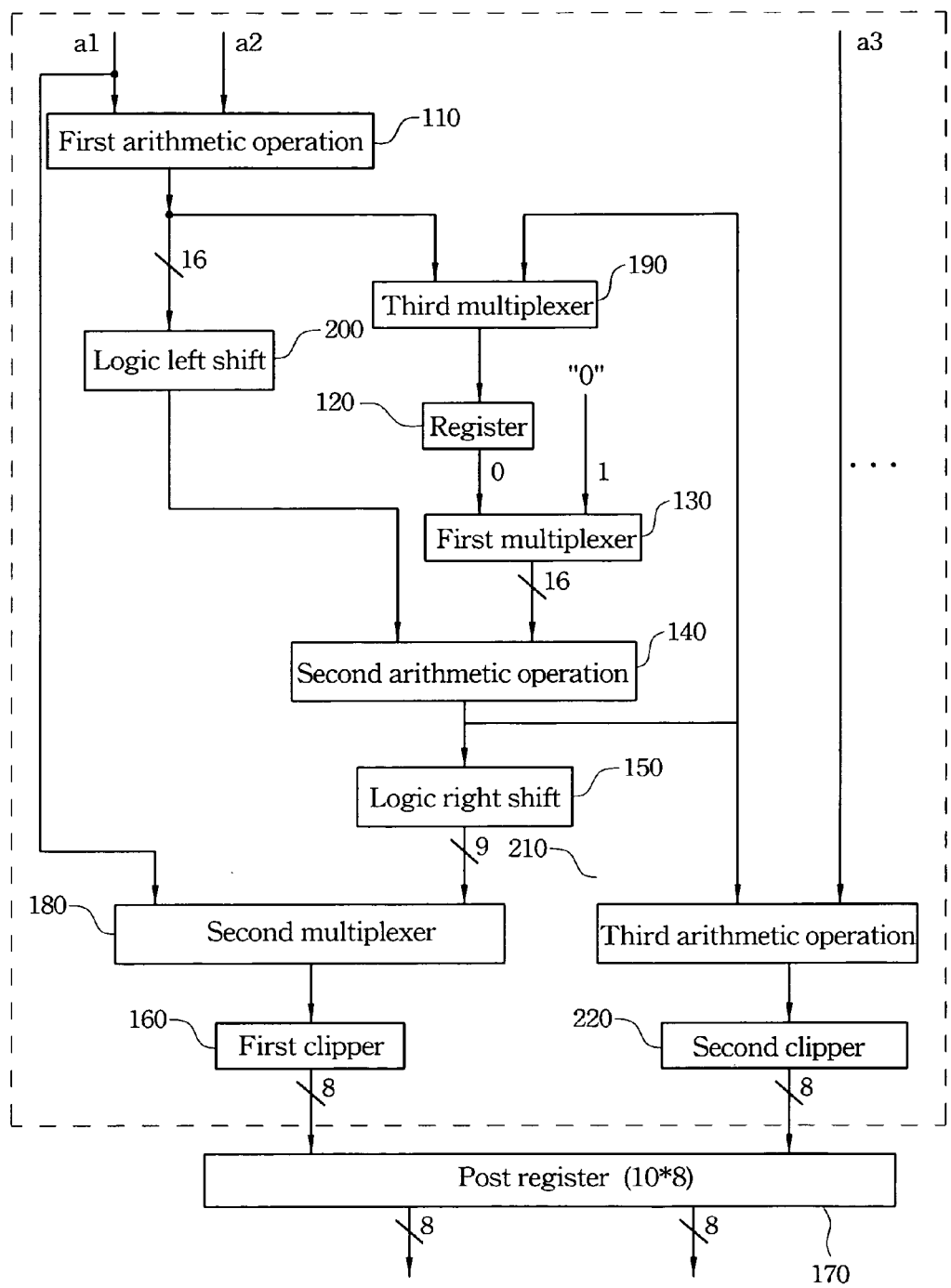
FIG. 19 is a flow chart which illustrates shared adder based adjustable intra prediction scheme.

In addition, the computation of the plane prediction mode is so complicated that a redundant execution period is needed. Thus, another flexible circuit scheme is provided for different purpose. In accordance with the characteristic that each output value in the row is calculated by adding the difference value "b" to its left adjacent output value as shown in FIG. 18. After calculating the "A0" value with the prediction circuit device, repeat adding the "b" value to figure out other right pixels in the same row. In FIG. 19, a third arithmetic operation unit 210 (adder) and a second clipper 220 are added to implement circuit expansion to enhance the hardware efficiency. Based on the simulated result, only an expansion circuit is needed to let the output efficiency of the circuit exceed "1" (pixel/cycle). As a result, using this method to support decoding HD1080i image format can limit the working frequency to be under 100 MHz.

According to the composition and the embodiments above, there are many advantages of the present invention over the prior art, such as:

1. Finding the feature of shared terms by simplifying the algorithms to decrease the operations of the shared terms and reduce the computation complexity.

2. The adder based prediction circuit can boost the hardware utility to reduce the computation and support all intra prediction modes under the H.264 video coding standard.

Although the present invention has been described in considerable detail with reference to certain preferred embodiments thereof, other embodiments are possible. Therefore, their spirit and scope of the appended claims should no be limited to the description of the preferred embodiments container herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An intra prediction circuit device applied to the H.264 video coding standard, comprising:
   a first arithmetic operation unit transforming pixel data with rebuilding surrounding sides to bit data;
   a register storing the bit data;
   a first multiplexer decoding the bit data stored in the register;
   a second arithmetic operation unit computing the bit data computed by the first arithmetic operation unit with the bit data of the first multiplexer;
   a logic right shift unit shifting the bit data computed by the second arithmetic operation unit in a logical right shift manner;
   a post register storing the bit data shifted by the logic right shift unit with the logical right shift manner;
   a clipper electrically connected between the logic right shift unit and the post register;
   a second multiplexer electrically connected between the logic right shift unit and the clipper; and
   a third multiplexer electrically connected between an output of the first arithmetic operation unit and an output of the second arithmetic operation unit.

2. The ultra prediction circuit device of claim 1, wherein the first arithmetic operation unit is an adder.

3. The intra prediction circuit device of claim 1, wherein the second arithmetic operation unit is an adder.

4. The intra prediction circuit device of claim 1, wherein the logic right shift unit computes the bit data with a range between 0 to 255 bits.

5. The intra prediction circuit device of claim 1, wherein the second multiplexer receives the pixel data.

6. The intra prediction circuit device of claim 1, further comprising a logic left shift unit electrically connected between the first arithmetic operation unit and the second arithmetic operation unit.

7. The intra prediction circuit device of claim 6, further comprising a third arithmetic operation unit electrically connected between an input of the third multiplexer and an output of the second arithmetic operation unit to receive a pixel data.

8. The intra prediction circuit device of claim 7, further comprising a second clipper electrically connected between the third multiplexer and the post register.

9. The intra prediction circuit device of claim 8, wherein the third arithmetic operation unit is an adder.

10. An intra prediction computation method applied to the H.264 video coding standard for calculating video pixel data, and the method comprising:
    transforming pixel data with rebuilding surrounding sides to bit data by a first arithmetic operation unit;
    storing the bit data by a register;
    decoding the bit data stored in the register by a first multiplexer;
    computing the bit data computed by the first arithmetic operation unit with the bit data of the first multiplexer by a second arithmetic operation unit;
    shifting the bit data computed by the second arithmetic operation unit in a logical right shift manner by a logic right shift unit;
    storing the bit data shifted by the logic right shift unit with the logical right shift manner by a post register;
    assembling a clipper electrically connected between the logic right shift unit and the post register;
    assembling a second multiplexer electrically connected between the logic right shift unit and the clipper;
    assembling a third multiplexer electrically connected between an output of the first arithmetic operation unit and an output of the second arithmetic operation unit; and
    whereby decreasing repeated computations of shared terms of calculating the video pixel data.

11. The intra prediction computation method of claim 10, wherein the first arithmetic operation unit is an adder.

12. The intra prediction computation method of claim 10, wherein the second arithmetic operation unit is an adder.

13. The intra prediction computation method of claim 10, wherein the logic right shift unit computes the bit data with a range between 0 to 255 bits.

14. The intra prediction computation method of claim 10, wherein the second multiplexer receives the pixel data.

15. The intra prediction computation method of claim 10, further comprising a logic left shift unit electrically connected between the first arithmetic operation unit and the second arithmetic operation unit.

16. The intra prediction computation method of claim 15, further comprising a third arithmetic operation unit electrically connected between an input of the third multiplexer and an output of the second arithmetic operation unit to receive a pixel data.

17. The intra prediction computation method of claim 16, further comprising a second clipper electrically connected between the third multiplexer and the post register.

18. The intra prediction computation method of claim 17, wherein the third arithmetic operation unit is an adder.

19. An intra prediction computation method applied to the H.264 video coding standard for calculating video pixel data, and the method comprising:
    transforming pixel data with rebuilding surrounding sides to bit data by a first arithmetic operation unit;
    storing the bit data by a register;
    decoding the bit data stored in the register by a first multiplexer;
    computing the bit data computed by the first arithmetic operation unit with the bit data of the first multiplexer by a second arithmetic operation unit;

shifting the bit data computed by the second arithmetic operation unit in a logical right shift manner by a logic right shift unit;

storing the bit data shifted by the logic right shift unit with the logical right shift manner by a post register, whereby decreasing repeated computations of shared terms of calculating the video pixel data; and implementing an I4MB prediction mode by the following steps:

setting multiple input prediction values of the pixel data L, K, J, I, X, A, B, C, D, E, F, G and H, and setting multiple output prediction values of the pixel data a, b, e, c, f, i, d, g, j, m, h, k, n, l, o and p wherein the input prediction values are set as a row of an algorithm table and the multiple output prediction values are set as a column of the algorithm table, and in a first cycle, the output prediction value a is set as A+2B+C;

in a second cycle, the output prediction value b is set as B+2C+D;

in a third cycle, the output prediction value e is set as B+2C+D;

in a fourth cycle, the output prediction value c is set as C+2D+E;

in a fifth cycle, the output prediction value f is set as C+2D+E;

in a sixth cycle, the output prediction value i is set as C+2D+E;

in a seventh cycle, the output prediction value d is set as D+2E+F;

in an eighth cycle, the output prediction value g is set as D+2E+F;

in a ninth cycle, the output prediction value j is set as D+2E+F;

in a tenth cycle, the output prediction value m is set as D+2E+F;

in an eleventh cycle, the output prediction value h is set as E+2F+G;

in a twelfth cycle, the output prediction value k is set as E+2F+G;

in a thirteenth cycle, the output prediction value n is set as E+2F+G;

in a fourteenth cycle, the output prediction value l is set as F+2G+H;

in a fifteenth cycle, the output prediction value o is set as F+2G+H;

in a sixteenth cycle, the output prediction value p is set as G+3H;

adding an input value H' adjacent to the input value H, and decomposing the input prediction value p to G+2H+H' to modify the input prediction value of the sixteenth cycle;

combining equivalent output prediction values into a shared term; therefore, the output prediction value "a" belongs to a single term, the output prediction values "b, e" combine into a single shared term, the output prediction values "c, f, i" combine into a single shared term, the output prediction values "d, g, j, m" combine into a single shared term, the output prediction values "h, k, n" combine into a single shared term, the output prediction values "l, o" combine into a single shared term, and the output prediction value "p" belongs to a single term whereby seven shared terms are provided; and extracting the input prediction values with double value form the seven share terms, and extending an initial term to form eight new terms and eight new cycles:

in the first new cycle, the output prediction value is A+B;

in the second new cycle, the output prediction value a is computed to B+C;

in the third new cycle, the output prediction values b, e are computed to C+D;

in the fourth new cycle, the output prediction values c, f, j are computed to D+E;

in the fifth new cycle, the output prediction values d, g, j, m are computed to E+F;

in the sixth new cycle, the output prediction values h, k, n are computed to G+H;

in the seventh new cycle, the output prediction values l, o are computed to G+H;

in the eighth new cycle, the output prediction value p is computed to H+H';

whereby only eight cycles decreased from sixteen cycles and sixteen additions are needed to compute: (A+B)+(B+C)+(D+E)+(E+F)+(F+G)+(G+H)+(H+H').

20. An intra prediction computation method applied to the H.264 video coding standard for calculating video pixel data, and the method comprising:

transforming pixel data with rebuilding surrounding sides to bit data by a first arithmetic operation unit;

storing the bit data by a register;

decoding the bit data stored in the register by a first multiplexer;

computing the bit data computed by the first arithmetic operation unit with the bit data of the first multiplexer by a second arithmetic operation unit;

shifting the bit data computed by the second arithmetic operation unit in a logical right shift manner by a logic right shift unit;

storing the bit data shifted by the logic right shift unit with the logical right shift manner by a post register, whereby decreasing repeated computations of shared terms of calculating the video pixel data; and implementing an I16MB prediction mode by the following steps:

a. figuring a horizontal (H) value and a vertical (V) value of the pixel data with the following equations:

$$H=(Px[15]-Px[-1])<<3+(Px[14]-Px[0])<<3-(Px[14]-Px[0])+(Px[13]-Px[1])<<2+(Px[13]-Px[1])<<1+(Px[12]-Px[2])<<2+(Px[12]-Px[2])+(Px[11]-Px[3])<<2+(Px[10]-Px[4])<<1+(Px[10]-Px[4])+(Px[9]-Px[5])<<1+(Px[8]-Px[6])$$

b. figuring the values of a, b, c of the pixel data respectively with the following equations:

$$a=16*(p[-1,15]+p[15,-1])$$

$$b=(5*H+32)>>6$$

$$c=(5*V+32)>>6$$

c. computing an output prediction value with the following equation in accordance with the values of a, b, c:

$$pred_L[x,y]=Clip1((a+b*(x-7)+c*(y-7)+16)>>5)$$

where [x,y] denotes the corresponding address ($0 \leq x \leq 15$, $0 \leq y \leq 15$) of the pixel in a 16×16 macro block after the computation; [>>] denotes the shifting activity; and Clip 1 denotes the computation result value limited among the range 0 to 255 bytes.

21. The intra prediction computation method of claim 20, wherein the equations of figuring the vertical (V) value is identical to the equations of figuring the horizontal (H) value in the step a.

* * * * *